Dec. 24, 1957 R. S. HERBST 2,817,533
SELF-CENTERING PRECISION CHUCK
Filed March 30, 1956

INVENTOR.
RONALD S. HERBST
BY
W. E. Thibodeau, A. W. Dew & H. I. Forman
ATTORNEYS

United States Patent Office 2,817,533
Patented Dec. 24, 1957

2,817,533
SELF-CENTERING PRECISION CHUCK

Ronald S. Herbst, Philadelphia, Pa., assignor to the United States of America as represented by the Secretary of the Army Application March 30, 1956, Serial No. 575,295

6 Claims. (Cl. 279—33)

(Granted under Title 35, U. S. Code (1952), sec. 266)

The invention described herein may be manufactured and used by or for the Government for governmental purposes without payment of any royalty thereon.

This invention relates to a self-centering chuck and has for an object to provide a simple and inexpensive device of this class adapted for the precision handling of workpieces.

Many prior suggestions for chucks have contemplated the use of cams of changing radius of curvature where work holding jaws are actuated to and from a work holding position. The cutting of such cams is an expensive operation where uniformity and precision are required. This invention provides a chuck in which no such cam of changing radius of curvature has to be cut.

One suggestion for eliminating the prior cams has contemplated three worm wheels of the same size driven from a worm shaft. It has been estimated that the cost of obtaining smaller tolerances than several thousandths of an inch in such a construction would be prohibitive because, for example, it would be difficult to have each of the three worm wheels start at exactly the same time by their driving worms. The necessity for clearance spaces between the teeth of the worm wheels adds to the difficulty in obtaining precision of movement in each work holding member.

According to this invention, much smaller tolerances and greater precision in movement of the work holding members have been made possible without the high cost of production usually incident to greater accuracy. Specifically, an outer plate relatively rotatable with respect to an inner plate, carries round work holding members eccentrically mounted and similar. Pins project from the inner plate through the outer plate for actuating the work holding members by their rotation into contact with the work.

Figure 1:
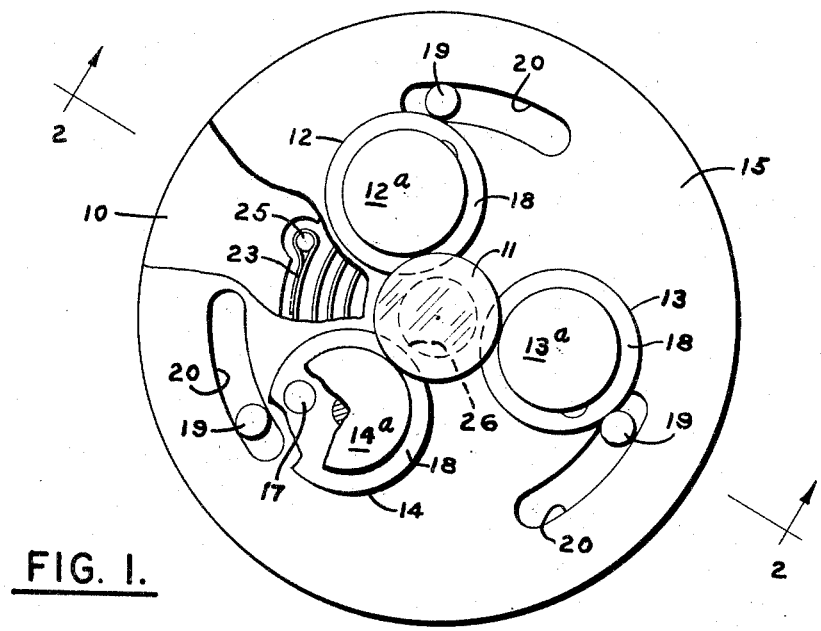
Fig. 1 is a top plan view of a preferred embodiment of this invention with part of the outer plate broken away.
Figure 2:
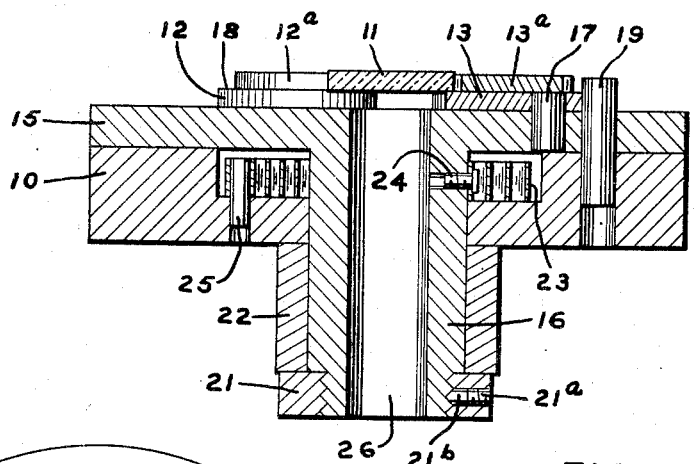
Fig. 2 is a section on the line 2—2 of Fig. 1 with the broken away portion replaced.

A rotatable actuating or inner plate 10 moves three work holding members 12, 13 and 14 into cooperation with the workpiece 11. Each of these work holding members is in two parts, the lower and larger diameter parts 12, 13 and 14, support upper parts 12ª, 13ª and 14ª each of which is concentric with its lower part. The top or outer plate 15 has secured thereto a tubular portion 16 and this top plate 15 is provided with recesses in which are located pins 17 constituting the centers about which each of the work holding members is eccentrically mounted for rotation in grasping and releasing the work. In the embodiment illustrated each of the work holding members is provided with a ledge 18 on which rests the work 11 in the embodiment illustrated. A reason for the work holding members being in two parts is for adaptability to workpieces of different sizes. Smaller upper portions 12ª, 13ª and 14ª than those illustrated may be replaced on the lower parts to enable the supporting ledge 18 to be wider and a workpiece 11 of larger diameter to be gripped at its periphery. Actuating pins 19 are secured within the rotatable plate 10 and project through the plate 15 for engagement with each of the work holding members. These actuating pins 19 by contact with a side of the work holding members on rotation of plate 10 cause each of such members to be moved about its eccentric axis into contact with the work. Each pin 19 projects through an arcuate slot 20 in the plate 15 of length sufficient for the pins 19 to be moved from an open position for the work holding members to a closed position in which the members grasp and retain the work. A nut 21 is secured at the bottom of the tubular portion 16 for supporting the spacing sleeve 22. A set screw 21a in the nut 21 engages a soft deformable material such as lead 21b to compress such material against the threads and thus avoid deforming the threads while holding the nut firmly in position. A spiral spring 23 is secured at its inner end to a pin 24 within the portion 16. The outer end of this spring 23 is secured to a pin 25 which is within the rotatable plate 10. The spring 23 tends to effect relative rotation between the plates 10 and 15 for the purpose of moving or tending to move the work holding members to a work clamping position.

In operation, this chuck has been designed for use in centering lenses. One lens 11 is positioned on the ledges 18 and accurately held in centered position as illustrated. It is coated with cement and the lens to be bonded thereto is placed over the lower lens section. A light shines through the bore 26 and by moving the top lens portion relative to the lower portion it is possible for an operator to have the lens sections brought in optical alignment as distinguished from mechanical alignment. When the two lens sections are thus in optical alignment the jaw members or work holding members 12, 13 and 14 with their upper parts 12ª, 13ª and 14ª are opened to release the work, the two lens sections are removed and carefully placed for drying.

Figure 3:
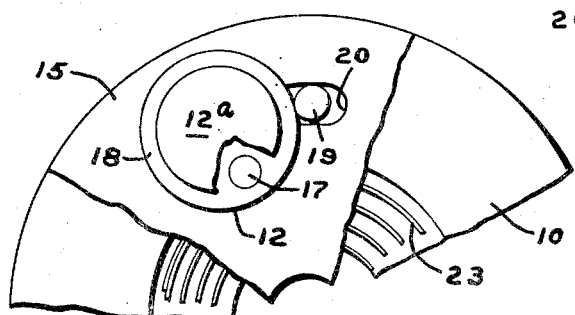
Fig. 3 is a top plan view with parts broken away and showing the work holding member in its open or non-work-holding position.

Among the advantages of this invention may be mentioned first, the simplicity of construction whereby circular work holding members 12, 13 and 14 with their upper parts 12ª, 13ª and 14ª are easier to cut than are cams having changing radii of curvature. The chuck illustrated is not only self-centering but accurate to within 5 ten-thousandths of an inch on a total indicator reading. As distinguished from this degree of precision, a chuck of the type referred to above in which the three circular work holding members are actuated from a worm shaft, could be accurate to within only a few thousandths of an inch. Any inaccuracy in manufacture of the present chuck can be further compensated to obtain a still greater degree of precision by the use of new pins 19 made larger or smaller in diameter as the need arises. The present chuck is easily cleaned. The spring 23 holds the work holding members including both their upper and lower parts in their closed or work holding position. In order to release the work rotatable plate 10 is moved from the position illustrated in Fig. 1 to a position illustrated in Fig. 3 by partial rotation. The operator then removes the work and with a finger rotates the lower parts of the work holding members 12, 13 and 14 to the open position illustrated in Fig. 3. The width of the opaque supporting ledge 18 is usually of little importance in getting the optical axes of the two lens elements into alignment.

I claim:

1. A precision chuck comprising an outer plate, a second plate rotatable relative to said outer plate about an axis pasing through the outer plate, at least three work holding members rotatably carried by said outer plate, each holding member having an arcuate ledge of uniform radius of curvature, and each member having an axis of rotation eccentric to its center of curvature by the same amount as is said axis in each other member, pins secured to said second plate and passing through openings in said outer plate, each pin being at the same distance from the center of rotation of said second plate as is each other pin for cooperation with an edge of a holding member and effecting rotation of a holding member for gripping a workpiece.

2. A chuck according to claim 1 in which a spring cooperates with said plates tending to effect relative rotation between said plates in a direction toward a work clamping position.

3. A chuck according to claim 1 in which each work holding member is comprised of concentric upper and lower parts with the upper part being of smaller diameter than the lower part, whereby a supporting ledge for a workpiece is formed on a peripheral portion of a lower part and an edge of an upper part may grip an edge of a workpiece.

4. A chuck according to claim 2 in which said outer plate has an axial and tubular stem passing through said second plate and on which said second plate is relatively rotatable.

5. A chuck according to claim 4 in which said stem has an axial bore therethrough whereby when a lens is being held by said chuck, a lamp may project its rays through said bore.

6. A chuck acccording to claim 5 in which a tubular portion is provided within at least a portion of said stem bore and about which said chuck may be rotated.

References Cited in the file of this patent

UNITED STATES PATENTS

| | | |
|---|---|---|
| 1,187,920 | Muller | June 20, 1916 |
| 2,593,706 | Von Zelewsky | Apr. 22, 1952 |

FOREIGN PATENTS

| | | |
|---|---|---|
| 636,525 | France | Jan. 12, 1928 |